United States Patent
Lee et al.

(10) Patent No.: US 9,362,783 B2
(45) Date of Patent: Jun. 7, 2016

(54) WIRELESS POWER TRANSMISSION APPARATUS USING ULTRASOUND

(71) Applicant: Electronics and Telecommunications Research Institute, Daejeon (KR)

(72) Inventors: Sung Q Lee, Daejeon (KR); Gunn Hwang, Daejeon (KR); WooSub Youm, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 204 days.

(21) Appl. No.: 14/192,508

(22) Filed: Feb. 27, 2014

(65) Prior Publication Data

US 2015/0003207 A1  Jan. 1, 2015

(30) Foreign Application Priority Data

Jun. 27, 2013  (KR) .......................... 10-2013-0074537

(51) Int. Cl.
*H04B 1/06* (2006.01)
*H02J 17/00* (2006.01)
(52) U.S. Cl.
CPC ....................................... *H02J 17/00* (2013.01)
(58) Field of Classification Search
CPC ....................................................... H04B 11/00
USPC .......................................... 367/135; 333/186
See application file for complete search history.

(56) References Cited

U.S. PATENT DOCUMENTS

| 6,798,716 | B1 | 9/2004 | Charych | |
|---|---|---|---|---|
| 7,902,943 | B2 * | 3/2011 | Sherrit | H01L 41/107 310/335 |
| 8,604,644 | B2 * | 12/2013 | Park | H02J 17/00 307/104 |
| 8,847,548 | B2 * | 9/2014 | Kesler | H02J 5/005 320/108 |
| 9,094,112 | B2 * | 7/2015 | Perry | H04B 11/00 |
| 2008/0265835 | A1 | 10/2008 | Reed et al. | |

FOREIGN PATENT DOCUMENTS

KR  10-2012-0068334 A  6/2012

* cited by examiner

*Primary Examiner* — Mark Hellner (57) ABSTRACT

Provided is a wireless power transmission apparatus. The apparatus includes an ultrasound transmitter generating an ultrasound signal in response to an external source voltage and transmitting the generated ultrasound signal to a medium layer and an ultrasound receiver receiving the ultrasound signal through the medium layer and converting the received ultrasound signal into a driving voltage. The ultrasound transmitter and receiver are manufactured to control impedance values thereof to be matched with each other and a distance between the ultrasound transmitter and receiver is controlled according to predetermined distance conditions.

16 Claims, 5 Drawing Sheets

WIRELESS POWER TRANSMISSION APPARATUS USING ULTRASOUND

CROSS-REFERENCE TO RELATED APPLICATIONS

This U.S. non-provisional patent application claims priority under 35 U.S.C. §119 of Korean Patent Application No. 10-2013-0074537, filed on Jun. 27, 2013, the entire contents of which are hereby incorporated by reference.

BACKGROUND OF THE INVENTION

The present invention disclosed herein relates to a wireless power transmission apparatus, and more particularly, to a wireless power transmission apparatus using ultrasound.

There are generally three ways of wirelessly transferring energy. One way is transferring power using electromagnetic induction, another way is transferring power using radio frequency (RF), and the other way is transferring power using ultrasound.

Power transmission apparatuses using electromagnetic induction each includes a charge parent generating charging power using an external power source and a power receiving module receiving the charging power through an electromagnetic induction phenomenon from the charge parent. The electromagnetic induction technology has great efficiency to be commercialized.

However, in the case of electromagnetic waves, transferred energy is rapidly reduced as being inversely proportional to a square of a distance. Accordingly, power transmission apparatuses using electromagnetic induction are limited to being used when a distance between the charge parent and the power receiving module is short such as several centimeters.

Power transmission apparatuses using RFs collect energy of RFs whose radio ranges are very long and supply power to electronic devices or sensors. RFs exist in the air and have very broad radio ranges. However, since RFs have low energy densities, energy amounts after energy conversion are small.

Power transmission apparatuses using ultrasound each includes a transmitter generating ultrasound and a receiver receiving the generated ultrasound. An ultrasound generation apparatus generates oscillation, a medium is oscillated by an interaction between the oscillation and the medium, and ultrasound is transferred through the oscillated medium. Recently, systems for charging batteries by using such ultrasound generation apparatuses have been disclosed.

Also, power transmission apparatuses using ultrasound may be used with various media such as water and human skin. However, as in the case of under water or human skin, when an ultrasound transmitter and an ultrasound receiver are separated from each other, efficiency of power transmission between the ultrasound transmitter and ultrasound receiver decreases.

SUMMARY OF THE INVENTION

The present invention provides a wireless power transmission apparatus in which a distance between an ultrasound transmitter and an ultrasound receiver is determined according to optimal distance condition to increase efficiency of wireless power transmission.

Embodiments of the present invention provide wireless power transmission apparatuses including an ultrasound transmitter generating an ultrasound signal in response to an external source voltage and transmitting the generated ultrasound signal to a medium layer and an ultrasound receiver receiving the ultrasound signal through the medium layer and converting the received ultrasound signal into a driving voltage. The ultrasound transmitter and receiver are manufactured to control impedance values thereof to be matched with each other and a distance between the ultrasound transmitter and receiver is controlled according to predetermined distance conditions.

In other embodiments of the present invention, wireless power transmission apparatuses include an ultrasound transmitter generating an ultrasound signal in response to an external source voltage and transmitting the generated ultrasound signal to a medium layer and an ultrasound receiver receiving the ultrasound signal through the medium layer and converting the received ultrasound signal into a driving voltage. A distance between the ultrasound transmitter and receiver is determined according to predetermined distance conditions. The ultrasound receiver includes a light emitter for alignment, the light emitter generating an optical signal, and the ultrasound transmitter includes a camera module taking images for an alignment with the ultrasound receiver according to the optical signal.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Hereinafter, in order to allow a person with ordinary skill in the art to easily execute technical thoughts of the present invention, embodiments of the present invention will be described in detail with reference to the attached drawings. Like reference numerals refer to like elements. Similar reference numerals refer to similar elements. The embodiments to be described below are just examples and may be variously changed and modified within a range of the technical thoughts of the present invention.

Figure 1:
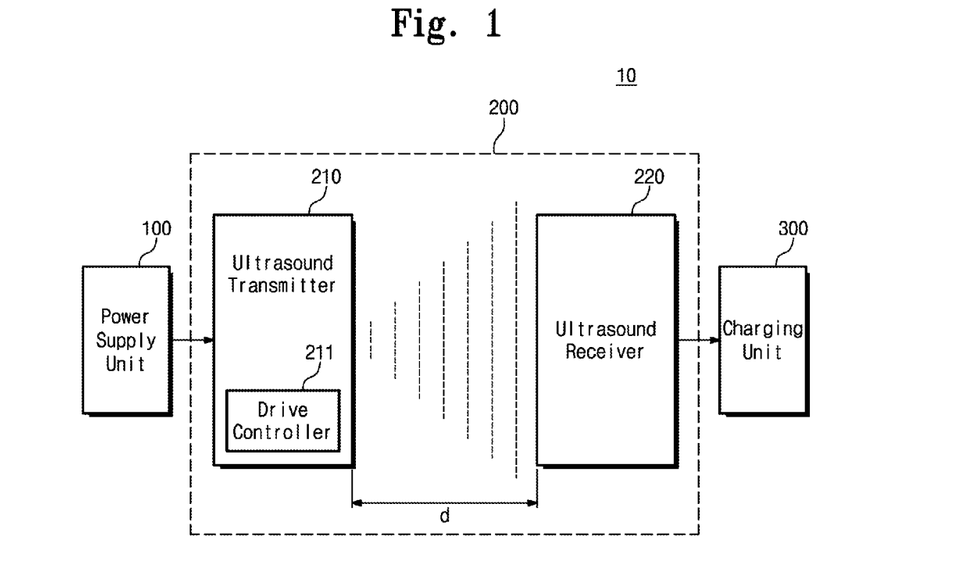
FIG. 1 is a block view illustrating a wireless power transmission apparatus according to an embodiment of the present invention.

FIG. 1 is a block view illustrating a wireless power transmission apparatus 10 according to an embodiment of the present invention. Referring to FIG. 1, the apparatus 10 includes a power supply unit 100, an ultrasound transmission unit 200, and a charging unit 300.

The power supply unit 100, in response to an external power supply voltage, generates a supply voltage to be transferred to the ultrasound transmission unit 200.

The ultrasound transmission unit 200, in response to the supply voltage applied from the power supply unit 100, generates a charge voltage to be transferred to the charging unit 300. Based on the charging voltage, a battery may be charged with power.

In detail, the ultrasound transmission unit 200 includes an ultrasound transmitter 210 and an ultrasound receiver 220. The ultrasound transmitter 210 is electrically connected to the power supply unit 100 and receives the supply voltage. The ultrasound transmitter 210 converts the supply voltage that is an electrical signal into an ultrasound signal and transmits the ultrasound signal to the ultrasound receiver 220. The ultrasound signal generated from the ultrasound transmitter 210 may be transmitted to the ultrasound receiver 220 through a medium layer.

Also, the ultrasound transmitter 210 includes a drive controller 211. The drive controller 211 controls overall operations necessary for an alignment process and optimal distance conditions of the ultrasound transmission unit 200. For example, the drive controller 211 may control variances in a distance d between the ultrasound transmitter 210 and the ultrasound receiver 220 by controlling a drive control frequency of an ultrasound signal.

The ultrasound receiver 220 receives the ultrasound signal transferred through the medium layer. The ultrasound receiver 220, in response to the received ultrasound signal, generates a charging voltage to be transferred to the charging unit 300. The ultrasound receiver 220 converts the received ultrasound signal into the charging voltage that is an electric signal.

In the embodiment, the medium layer may be defined as the distance d between the ultrasound transmitter 210 and the ultrasound receiver 220. For example, the medium layer may be formed of one of water, skin, metal, and nonmetal but is not limited thereto.

Also, efficiency of transmitting the ultrasound signal may vary with properties of the medium layer and the distance d between the ultrasound transmitter 210 and the ultrasound receiver 220. To optimize the efficiency of transmitting the ultrasound signal, the distance d between the ultrasound transmitter 210 and the ultrasound receiver 220 may be set according to optimal distance conditions. The optimal distance conditions mean that the distance d between the ultrasound transmitter 210 and the ultrasound receiver 220, to have maximum transmission efficiency, is controlled according to predetermined distance conditions.

The charging unit 300 is electrically connected to the ultrasound receiver 220 and receives the charging voltage. In the embodiment, the charging unit 300 may include a battery for supplying power to a load and may charge the battery in response to the received charging voltage. In the embodiment, the battery may be embodied as a secondary battery.

As described above, in the case of the apparatus 10, since the distance d between the ultrasound transmitter 210 and the ultrasound receiver 220 is set according to the optimal distance conditions, the efficiency of transmitting the ultrasound signal may increase.

Figure 2:
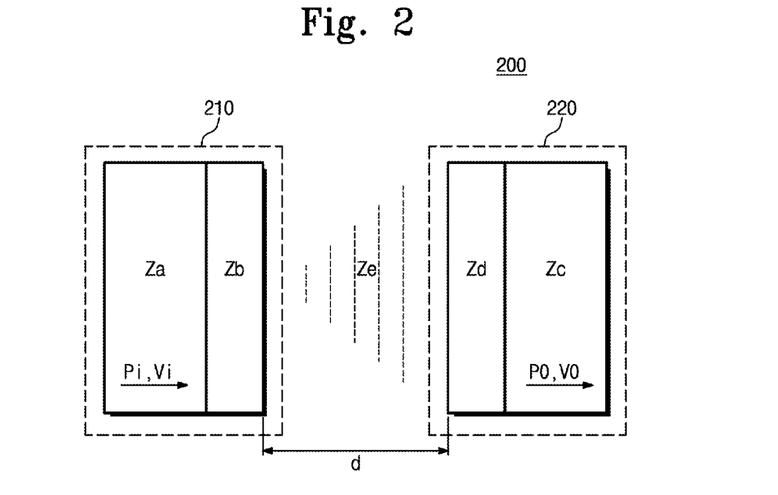
FIG. 2 is a view illustrating optimal distance conditions according to properties of a medium of an ultrasound transmission unit shown FIG. 1.

FIG. 2 is a view illustrating optimal distance conditions according to properties of a medium of the ultrasound transmission unit 200. Referring to FIG. 2, the ultrasound transmission unit 200 is embodied as the ultrasound transmitter 210 and the ultrasound receiver 220 and may transmit an ultrasound signal according to an optimal distance d according to the properties of the medium.

The ultrasound transmitter 210 includes a first impedance layer Za and a second impedance layer Zb. The first impedance layer Za may generate an ultrasound signal, and the second impedance layer Zb may be a matching layer for a match with the ultrasound receiver 220. The ultrasound signal is generated from the first impedance layer Za and is transmitted to a medium layer Ze through the second impedance layer Zb.

The ultrasound transmitter 220 includes a third impedance layer Zc and a fourth impedance layer Zd. The fourth impedance layer Zd may be a matching layer for a match with the ultrasound transmitter 210, and the third impedance layer Zc may be a layer for receiving the ultrasound signal. The ultrasound signal transmitted from the medium layer Ze is transmitted to the third impedance layer Zc through the fourth impedance layer Zd.

The medium layer Ze may be located between the ultrasound transmitter and receiver 210 and 220. As described with reference to FIG. 1, water or human skin may be as the medium layer.

In the embodiment, the first impedance layer Za and the third impedance layer Zc may be embodied as a same impedance value, respectively. Also, the first and third impedance layers Za and Zc may be formed of same piezoelectric material. Also, the second impedance layer Zb and the fourth impedance layer Zd may be matching layers having a same impedance value, respectively. Accordingly, impedance values of the ultrasound transmitter and receiver 210 and 220 may be same as each other.

Also, in the embodiment, the impedance value of the second impedance layer Zb may be determined as a harmonic mean of impedances of the first impedance layer Za and the medium layer Ze. An impedance value of the fourth impedance layer Zd may be determined as a harmonic mean of impedances of the third impedance layer Zc and the medium layer Ze.

As described above, the ultrasound signal generated from the first impedance layer Za is received by the third impedance layer Zc through the medium layer Ze. However, efficiency of transmitting the ultrasound signal may vary with properties and the distance d of the medium layer Ze. An impedance value of the medium layer Ze is not fixed but may vary with a kind of a medium. As an example, wireless power transmission may be applied using various media such as water, human skin, and the air and impedance values of respective media are different from one another.

Accordingly, it is necessary to transmit an ultrasound signal without decrease of efficiency of transmitting the ultrasound signal according to the kind of the media.

$$Tr = \frac{P_o V_o}{P_i V_i} = \frac{4}{2 + \left(\frac{Z_3}{Z_1} + \frac{Z_3}{Z_1}\right)\cos^2 k_2 L + \left(\frac{Z_2^2}{Z_1 Z_3} + \frac{Z_1 Z_3}{Z_2^2}\right)\sin^2 k_2 L} \quad \text{Equation (1)}$$

Referring to Equation 1, generally, transmissibility Tr of ultrasound signals is determined by a gain ratio of an ultrasound signal PiVi outputted from an ultrasound transmitter to an ultrasound signal PoVo received by an ultrasound receiver.

In detail, considering the transmissibility Tr between the ultrasound transmitter 210 and the medium layer, an impedance of the first impedance layer Za generating oscillations is designated as a first impedance Z1. An impedance of the second impedance layer Zb for a match between the ultrasound transmitter and receiver 210 and 220 is designated as a second impedance Z2. An impedance of the medium layer Ze is designated as a third impedance Z3.

To maximize the transmissibility Tr between the ultrasound transmitter 210 and the medium layer Ze as 1, the second impedance Z2 may be matched with a harmonic mean of the first impedance Z1 and the third impedance Z3. Also, when a distance of the second impedance layer Zb is designated as L, the distance L may be determined as $\lambda/4$. A value of K2 may be determined as $2*\lambda/2$.

Referring to Equation 1 according to described conditions, the transmissibility Tr of transmitting ultrasound from the ultrasound transmitter 210 to the medium layer Ze may be 1 that is a maximum value.

The ultrasound transmitter and receiver 210 and 220 may have the same impedance values. Accordingly, an impedance value obtained by adding the first and second impedances Z1 and Z2 of the ultrasound transmitter 210 to each other is designated as Z', an impedance of the ultrasound receiver 220 may be Z'.

Accordingly, based on conditions of transmitting the ultrasound signal to the medium layer Ze through the first and second impedance layers Za and Zb as described with Equation 1, the transmissibility Tr of the ultrasound signal may be determined as following Equation 2.

$$Tr = \frac{P_o V_o}{P_i V_i} = \frac{4}{2 + \left(\frac{Z'}{Z'} + \frac{Z'}{Z'}\right)\cos^2 k_3 d + \left(\frac{Z_3^2}{Z'Z'} + \frac{Z'Z'}{Z_3^2}\right)\sin^2 k_3 d} \quad \text{Equation (2)}$$

Referring to Equation 2, the transmissibility Tr of the ultrasound signal may vary with the distance d of the medium layer Ze and the impedance value Z3 of the medium layer Ze. However, since a value of the impedance Z3 varies with the kind of media, the ultrasound transmission unit 200 may maintain the transmissibility Tr to be high by determining the distance d as following Equation 3. Similarly, in conditions of Equation 2, a value of d may be determined as $\lambda/4$ that is the distances L of the second and fourth impedance layers Zb and Zd. A value of K3 may be determined as $2*\lambda/2$. Referring to Equation 2 according to described conditions, the transmissibility Tr of transmitting ultrasound from the ultrasound transmitter 210 to the ultrasound receiver 220 through the medium layer Ze may be 1 that is a maximum value.

$$d = \frac{\lambda}{2} N \quad \text{Equation (3)}$$

As described above, to maximize the transmissibility Tr of the ultrasound signal, the distance d between the ultrasound transmitter and receiver 210 and 220 may be determined as following Equation 3. In the embodiment, N may be a positive integer including 0 and a value of N may vary with the kind of media. Also, a wavelength $\lambda$ may be determined according to a frequency f based on the ultrasound signal. In the embodiment, a driving frequency may be controlled by the drive controller 211.

Also, in Equation 2, to maximize the transmissibility Tr of the ultrasound signal according to acoustic conditions, a value of K2 may be $2*\pi/\lambda$. The distance d of the medium layer Ze based on Equation 3 is introduced to Equation 2, the transmissibility Tr of the ultrasound signal may be maximized.

Also, in the embodiment, the distance L of the second impedance layer Zb may be $\lambda/4$ according to the harmonic mean of the impedances of the first impedance layer Za and the medium layer Ze. Similarly, a distance of the fourth impedance layer Zd may be $\lambda/4$ according to a harmonic mean of impedances of the third impedance layer Zc and the medium layer Ze. When N is 0, that is, the medium layer Ze is not present, the ultrasound transmitter 210 and the ultrasound receiver 220 may be closely attached to each other. As N becomes 0, the distance d of the medium layer Ze becomes 0.

As described above, although the ultrasound transmitter and receiver 210 and 220 are closely attached to each other, distances of the second and fourth impedance layers Zb and Zd are embodied as $\lambda/4$, respectively, thereby allowing a distance between the first and third impedance layers Za and Zc to be $\lambda/2$.

The distances of the second and fourth impedance layers Zb and Zd are $\lambda/4$, respectively, a sum of the distances becomes $\lambda/2$. Accordingly, according to Equation 2, when the ultrasound transmitter 210 is closely attached to the ultrasound receiver 220, the transmissibility Tr of the ultrasound signal may become maximized.

Also, in the embodiment, when the distance d between the ultrasound transmitter and receiver 210 and 220 is out of an optimal distance determined in Equation 3 due to external and internal environments, the distance d may be controlled by the driving frequency.

As described above, referring to Equations 2 and 3, the transmissibility Tr of the ultrasound signal may always be 1. Accordingly, regardless of the kind of media, the transmissibility Tr may be determined to the max according to the distance d of the medium layer Ze.

Figure 3:
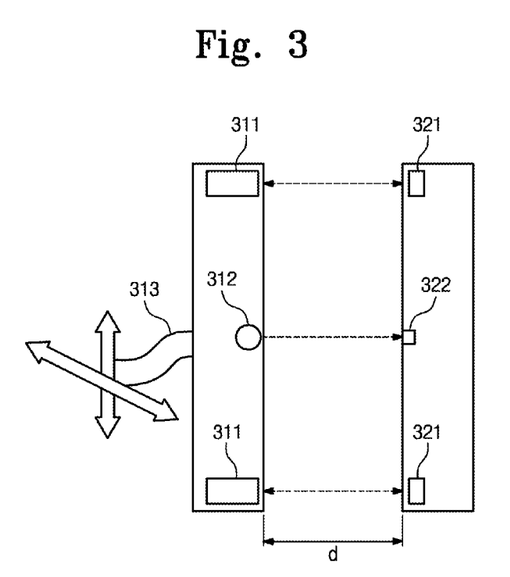
FIG. 3 is a view illustrating an ultrasound transmitter and an ultrasound receiver according to another embodiment of the present invention.

FIG. 3 is a view illustrating an ultrasound transmitter 310 and an ultrasound receiver 320 according to another embodiment of the present invention. Referring to FIG. 3, the ultrasound transmitter 310 includes a first electromagnetic device 311, a camera module 312, and a tube 313. The ultrasound receiver 320 includes a second electromagnet device 321 and a light emitter 322.

In an environment with less external environmental variances, the ultrasound transmitter and receiver 310 and 320 may transmit and receive wireless power based on optical distance conditions. However, in an environment such as underwater, particularly, under the sea, since the ultrasound transmitter and receiver 310 and 320 are not well aligned, efficiency of wireless power transmission may decrease. Accordingly, it is necessary to allow the ultrasound transmitter and receiver 310 and 320 not to be misaligned in the environment such as underwater.

Also, general ultrasound transmitter and receiver repetitively attach to or detach from each other to be aligned. However, an ultrasound transmission unit includes an electromagnetic device and centers of the ultrasound transmitter and receiver 310 and 320 may be aligned with each other due to a gravitational force of the electromagnetic device.

In detail, the ultrasound transmitter and receiver 310 and 320 may be aligned with each other according to an occurrence of gravitational forces of the first electromagnetic device 311 and the second electromagnetic device 321. For example, the first electromagnet device 311 may be formed of a coil and a yoke and the second electromagnetic device 321 may be formed only of a yoke.

Accordingly, as a current is applied to the first electromagnetic device 311, a magnetic force occurs in such a way that a gravitational force may work between the ultrasound transmitter and receiver 310 and 320.

The electromagnetic devices 311 and 321 are pulled by each other due to the gravitational forces, the centers of the ultrasound transmitter and receiver 310 and 320 may be aligned with each other.

The camera module 312 is attached to the ultrasound transmitter 310 and provides underwater image information. In detail, the camera module 312, in response to a signal of the light emitter 322 attached to the ultrasound receiver 320 for alignment, may provide images necessary for an alignment process with the ultrasound receiver 320. In the embodiment, the light emitter 322 for alignment may be embodied as a device for emitting light such as a light emitting diode (LED).

The tube 313 may be attached to the ultrasound transmitter 310 and may transfer the ultrasound transmitter 310 in response to an external remote control signal. For example, a user may control the tube 313 based on images taken by the camera module 312.

As described above, the tube 313 is controlled according to information of the images taken by the camera module 312, thereby aligning the ultrasound transmitter and receiver 310 and 320.

Figure 4:
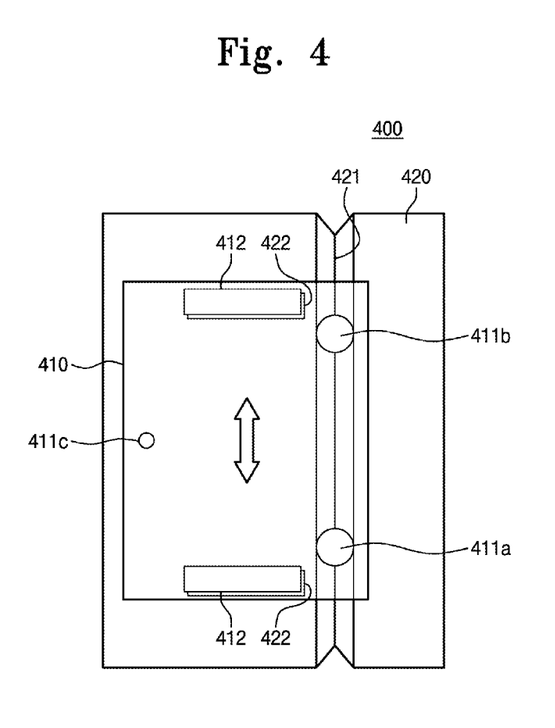
FIG. 4 is a view illustrating an ultrasound transmission unit having a ball-groove structure according to still another embodiment of the present invention.

FIG. 4 is a view illustrating an ultrasound transmission unit 400 having a ball-groove structure according to still another embodiment of the present invention. Referring to FIG. 4, the ultrasound transmission unit 400 may be embodied to have the ball-groove structure. As an example, the ultrasound transmission unit 400 shown in FIG. 4 may have a cylindrical shape. However, a shape of the ultrasound transmission unit 400 having the ball-groove structure is not limited thereto and may be variously embodied.

A general ball-groove structure is a structure in which three balls included in an ultrasound transmitter are all combined with a groove of an ultrasound receiver. However, in the general ball-groove structure, since the all three balls are combined with the groove, a movement for alignment is limited.

In the ball-groove structure of the ultrasound transmission unit 400, only two balls are combined with a groove, instead of all three balls being combined with the groove.

In detail, an ultrasound transmitter 410 includes first to third balls 411a, 411b, and 411c. The first and second balls 411a and 411b may be combined with a groove 421 of an ultrasound receiver 420. However, the third ball 411c is in contact with a surface with no groove 421, instead of being combined with the groove 421 of the ultrasound receiver 420. Accordingly, although the first and second balls 411a and 411b are combined with the groove 421, an alignment operation in a height direction may be performed. The ultrasound transmitter 410, as gravitational forces of first second electromagnetic devices 412 and 422 occur, may move in the height direction and may be aligned with the ultrasound receiver 420.

As described with reference to FIGS. 3 and 4, the ultrasound transmitter and receiver may be precisely aligned with each other underwater by using the electromagnetic devices ad the ball-groove structure. Also, in the embodiments, the electromagnetic devices and the ball-groove structure are used, thereby the distance between the ultrasound transmitter and receiver becomes 0. However, although the distance between the ultrasound transmitter and receiver becomes 0, as described with reference to FIG. 2, the transmissibility of ultrasound may be maintained according to the optimal distance conditions.

Figure 5:
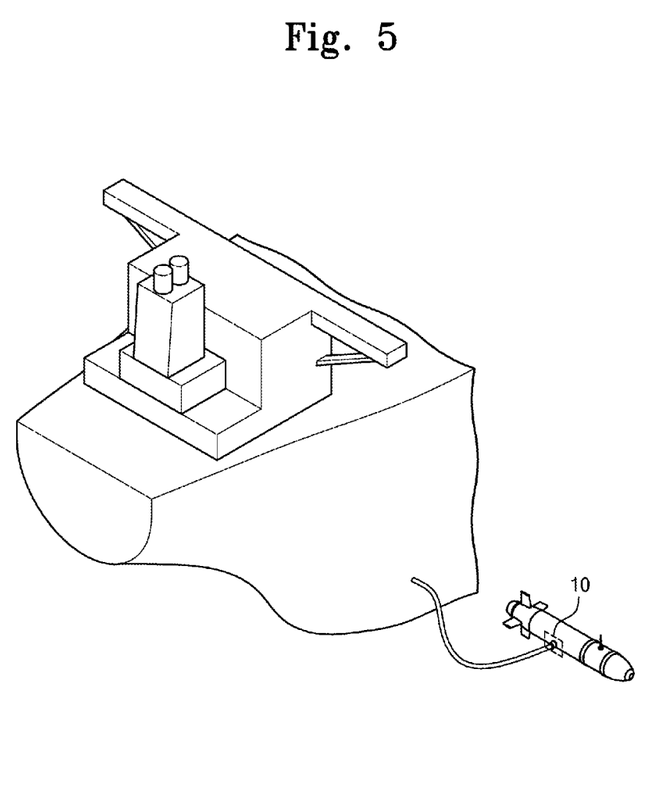
FIGS. 5 and 6 are views illustrating examples of applying the wireless power transmission apparatus of FIG. 1.
Figure 6:
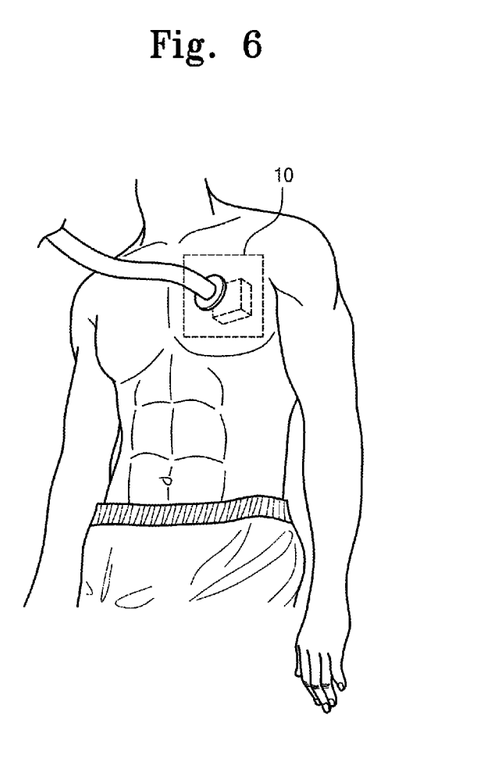

FIGS. 5 and 6 are views illustrating examples of applying the wireless power transmission apparatus 10. Referring to FIG. 5, the apparatus 10 may be embodied under the sea and may transmit wireless power. As an example, an ultrasound transmitter may be included in a ship and an ultrasound receiver may be included in a detection apparatus under the sea. The user, when the ultrasound receiver runs out of power, the wireless power may be transmitted by controlling the ultrasound transmitter. In the apparatus 10 shown in FIG. 5, the ultrasound transmitter and receiver may be closely attached to each other and transmit the wireless power.

Also, referring to FIG. 6, the apparatus may transmit wireless power to a medical device provided inside a human body. For example, the medical device may be a mechanical heart. Generally, when the mechanical heart runs out of power, the mechanical heart is replaced by an operation, which has a heavy burden of expenses and great dangerousness.

However, the ultrasound receiver provides an ultrasound signal according to the optimal distance conditions, thereby charging the mechanical heart with power. Accordingly, expenses may be largely reduced, there is no burden of operation, and the mechanical heart may be charged with power by using a safe method. Also, although the mechanical heart has been described as the device provided in the human body, the device provided in the human body is not limited thereto.

According to one or more embodiments, since a distance between an ultrasound transmitter and an ultrasound receiver is determined based on a predetermined distance, a wireless power transmission apparatus may transfer energy with high power transmission efficiency.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A wireless power transmission apparatus comprising:
an ultrasound transmitter generating an ultrasound signal in response to an external source voltage and transmitting the generated ultrasound signal to a medium layer; and
an ultrasound receiver receiving the ultrasound signal through the medium layer and converting the received ultrasound signal into a driving voltage,
wherein the ultrasound transmitter and the ultrasound receiver are manufactured to control impedance values thereof to be matched with each other, and a distance between the ultrasound transmitter and the ultrasound receiver is controlled according to predetermined distance conditions, and
wherein the ultrasound transmitter comprises a drive controller determining the distance between the ultrasound transmitter and the ultrasound receiver by controlling a driving frequency of the ultrasound signal when the distance between the ultrasound transmitter and the ultrasound receiver is out of the predetermined distance conditions.

2. The apparatus of claim 1, wherein the ultrasound transmitter and the ultrasound receiver are manufactured to allow the impedance values thereof to be same.

3. The apparatus of claim 1, wherein the ultrasound transmitter comprises:
a first impedance layer generating the ultrasound signal; and
a second impedance layer for allowing impedances of the first impedance layer and the medium layer to be matched with each other.

4. The apparatus of claim 3, wherein the ultrasound receiver comprises:
a third impedance layer converting the ultrasound signal into the driving voltage; and a fourth impedance layer for allowing impedances of the third impedance layer and the medium layer to be matched with each other.

5. The apparatus of claim 4, wherein the first and third impedance layers and the second and fourth impedance layers are manufactured to have same impedance values, respectively.

6. The apparatus of claim 4, wherein distances of the second and fourth impedance layers are determined to have λ/4 based on a driving frequency of the ultrasound signal, respectively.

7. The apparatus of claim 4, wherein the impedance value of the second impedance layer is a harmonic mean of the impedance values of the first impedance layer and the medium layer, and wherein the impedance value of the fourth impedance layer is a harmonic mean of the impedance values of the third impedance layer and the medium layer.

8. The apparatus of claim 1, wherein the distance d between the ultrasound transmitter and the ultrasound receiver controlled according to the predetermined distance conditions is determined as $$d = \frac{\lambda}{2}N,$$

wherein N is 0 or a positive integer and varies according to a type of the medium layer, and λ is determined by the driving frequency of the ultrasound signal.

9. The apparatus of claim 1, wherein the drive controller further controls a level of the external source voltage.

10. A wireless power transmission apparatus comprising:
an ultrasound transmitter generating an ultrasound signal in response to an external source voltage and transmitting the generated ultrasound signal to a medium layer; and
an ultrasound receiver receiving the ultrasound signal through the medium layer and converting the received ultrasound signal into a driving voltage,
wherein a distance between the ultrasound transmitter and the ultrasound receiver is determined according to predetermined distance conditions, and
wherein the ultrasound receiver comprises a light emitter for alignment, the light emitter generating an optical signal, and the ultrasound transmitter comprises a camera module taking images for an alignment with the ultrasound receiver according to the optical signal.

11. The apparatus of claim 10, further comprising a tube connected to the ultrasound transmitter and controlling a movement of the ultrasound transmitter.

12. The apparatus of claim 10, wherein the ultrasound transmitter comprises first to third balls for being aligned with the ultrasound receiver.

13. The apparatus of claim 12, wherein the ultrasound receiver is formed with at least one groove, the first and second balls are located to be movable along the at least one groove, and the third ball is in contact with one surface of the ultrasound receiver to be movable.

14. The apparatus of claim 10, wherein the ultrasound transmitter comprises a first electromagnetic device and the ultrasound receiver comprises a second electromagnetic device, and
wherein the ultrasound transmitter and the ultrasound receiver are aligned according to the predetermined distance conditions according to a gravitational force occurring between the first and second electromagnetic devices.

15. A wireless power transmission apparatus comprising:
an ultrasound transmitter generating an ultrasound signal in response to an external source voltage and transmitting the generated ultrasound signal to a medium layer; and
an ultrasound receiver receiving the ultrasound signal through the medium layer and converting the received ultrasound signal into a driving voltage,
wherein a distance between the ultrasound transmitter and the ultrasound receiver is determined according to predetermined distance conditions, and
wherein the ultrasound transmitter comprises first to third balls for being aligned with the ultrasound receiver and the ultrasound receiver is formed with at least one groove, the first and second balls being located to be movable along the at least one groove, the third ball being in contact with a surface of the ultrasound receiver that includes no groove.

16. The apparatus of claim 15, wherein the ultrasound transmitter comprises a first electromagnetic device and the ultrasound receiver comprises a second electromagnetic device, and
wherein the ultrasound transmitter and the ultrasound receiver are aligned according to the predetermined distance conditions according to a gravitational force occurring between the first and second electromagnetic devices.

* * * * *